Sept 17, 1957      T. F. GIBSON      2,806,665
COLLAPSIBLE FUEL TANK FOR AIRPLANES AND THE LIKE
Filed May 21, 1953      4 Sheets-Sheet 3

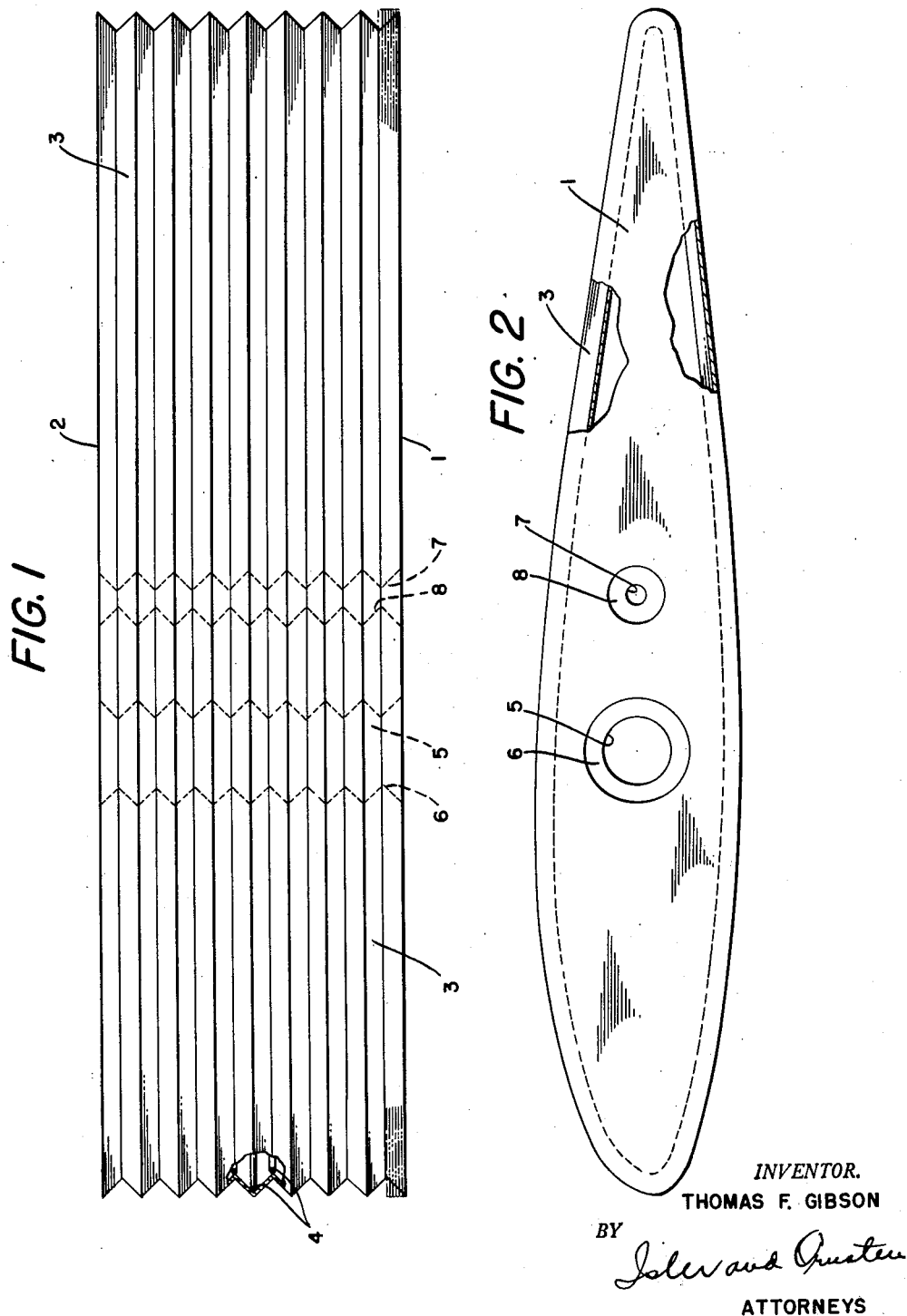

*INVENTOR.*
THOMAS F. GIBSON
BY
ATTORNEYS

Sept 17, 1957      T. F. GIBSON      2,806,665

COLLAPSIBLE FUEL TANK FOR AIRPLANES AND THE LIKE

Filed May 21, 1953      4 Sheets-Sheet 4

INVENTOR.
THOMAS F. GIBSON
BY
ATTORNEYS

United States Patent Office 2,806,665
Patented Sept. 17, 1957

2,806,665

COLLAPSIBLE FUEL TANK FOR AIRPLANES AND THE LIKE

Thomas F. Gibson, Cleveland Heights, Ohio

Application May 21, 1953, Serial No. 356,400

3 Claims. (Cl. 244—135)

This invention relates generally to collapsible fuel tanks for airplanes and the like.

In my U. S. Patent No. 2,423,095, there is disclosed in combination with the fuselage of an airplane, fixed wing portions at each side of the fuselage, and telescoping wings at each side of the fuselage movable into and out of said fixed wing portions, each telescoping wing being composed of movable sections adapted to be telescoped one within the other at adjacent sides of the fuselage. There is also disclosed an aileron movably supported in connection with the outermost section of each wing and maintained in extended position beyond the telescoping wing sections, as well as means compensating for different positions of the telescoped sections of the wings for actuating the ailerons in all positions of said sections, and independent controls for operating the telescoping sections of each wing.

Since it is conventional practice to carry fuel within the wings of airplanes, the carrying of fuel within the wings or wing sections of the airplane described in my aforesaid patent presents a somewhat difficult problem, since provision must be made for retraction or collapsing of fuel tanks as the wing sections are retracted or moved telescopically into each other.

A primary object of the invention, accordingly, is to provide fuel-carrying units for an airplane of the character described, which are automatically collapsed as the wing sections are retracted and the fuel supply depleted.

Another object of the invention is to provide a novel collapsible fuel tank or container which is especially adapted for use in connection with airplanes having telescoping wing sections of the character described.

A further object of the invention is to provide a novel method of filling the fuel tanks or containers while the wing sections are in extended position, which method involves the use of means which will not interfere with the operation of the wing sections.

Other objects and advantages of my invention will be apparent during the course of the following description. In the accompanying drawings forming a part of this specification and in which like numerals are employed to designate like parts throughout the same, Fig. 1A is a diagrammatic perspective view outlining an airplane, showing the wing structure in fully extended position, with portions broken away to more clearly show certain parts;

Fig. 2 is an end elevational view of the fuel tank;

Referring more particularly to Figs. 1 to 4 inclusive of the drawings, there is shown a fuel tank for an airplane, this tank consisting of flat ends 1' and 2', and sides 3 in the form of an accordion-pleated member. The tank is preferably made from a leak-proof rubberized fabric material, but may be made of any fuel-resistant material, and in order to insure a true accordion action of the pleated sides 3, reinforcing wires 4 are preferably incorporated in said sides along the joints between the pleats.

When the tank is filled, it is fully expanded to the position shown in solid lines in Fig. 1. As its contents are depleted, it will be contracted in a manner to be presently described, and the pleats constituting the sides of the tank, will be folded flat on each other, so that the length of the tank, in fully contracted condition, is but a small fraction of the length of the tank in fully expanded condition. In actual practice, a tank with is 24" in length, in fully expanded condition, was reduced to a length of only 1.152" in length, in fully contracted condition. The fully contracted condition of the tank is indicated by the broken lines at the lower left corner of Fig. 1.

Figure 1A:
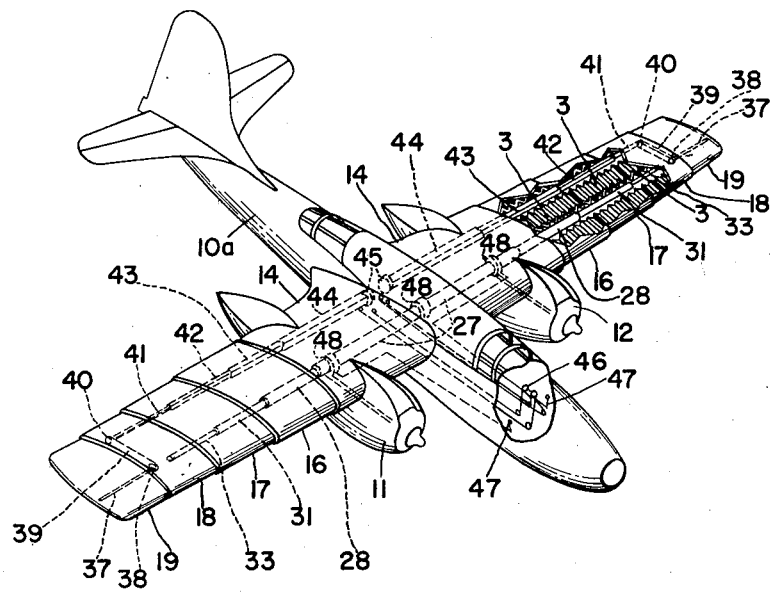
Fig. 1 is a top plan view of a collapsible fuel tank embodying the invention.

In Fig. 1A, there is depicted an airplane which is similar in all respects to that described in the aforesaid Patent No. 2,423,095, and reference to that patent may be had for a general description of the parts.

For purposes of the present invention, only those parts which are necessary to an understanding of the invention will be described.

In Fig. 1A, reference numberal 10a represents the main fuselage and 11 and 12 represent the auxiliary fuselage portions, these auxiliary fuselage portions constituting part of short lateral extensions or fixed wing portions 14 at opposite sides of the fuselage 10a.

Reference character 15 generally identifies the wing structure which may be composed of any desired number of sections telescoping within each other and with the housing 14. In the present illustration, three wing sections 16, 17 and 18 are shown, the section 16 fitting snugly in the housing 14, the section 17 in the section 16, and the section 18 in the section 17. Beyond the section 18 is the outer aileron section 19, which is maintained beyond the housing 14 when all of the sections 16, 17 and 18 are collapsed.

Figure 3:
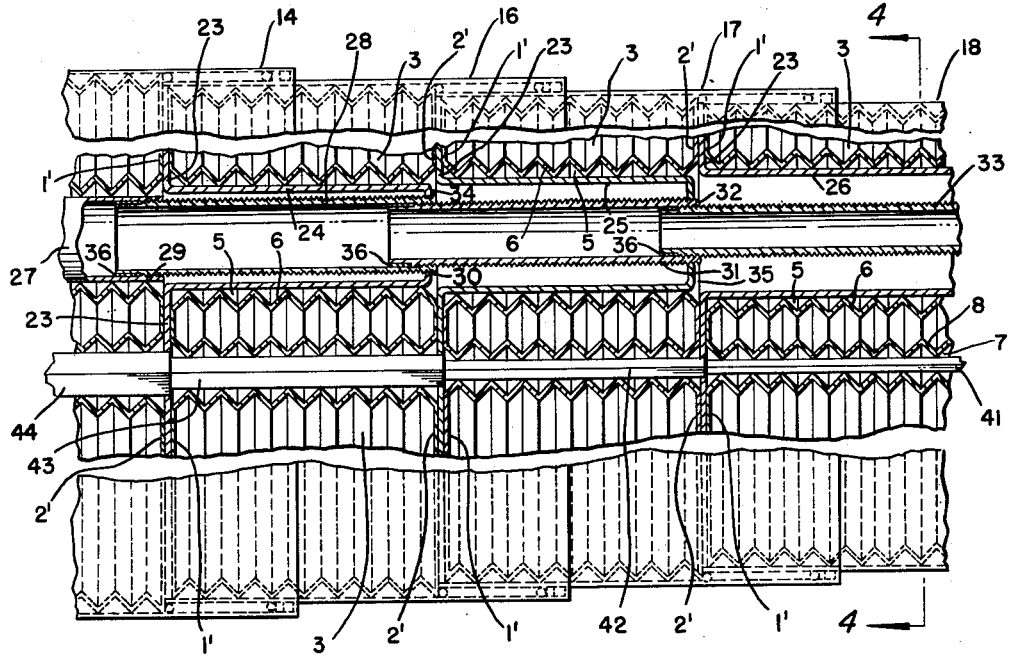
Fig. 3 is a fragmentary top plan view of an airplane wing embodying the invention; with portions broken away to show the wing structure and collapsible fuel tanks.

Each section 16, 17 and 18 has, as best shown in Fig. 3, an inner end wall 23, and tubular portions 24, 25 and 26 respectively, which extend outwardly. The tubular portion 24 being the smallest in diameter, whereas the portion 26 is the largest in diameter, and these portions are adapted to telescope one within the other when the sections 16, 17 and 18 are moved within and housed within the housing 14.

Arranged in the housing 14 is a tubular drive shaft 27, which is in threaded engagement with a tubular feed or screw shaft 28, as seen at 29.

The outer end of the shaft 28 has an internally threaded collar portion 30 in threaded engagement with another tubular screw shaft 31. The shaft 31 has at its outer end an internally threaded collar 32 in threaded engagement with another tubular screw shaft 33. The collars as at 30 and 32, and a corresponding collar at the end of the shaft 33 will have annular grooves to receive end wall portion on the tubes 24, 25 and 26, the end wall on the tube 24 being shown at 34 and on the tube 25 at 35. Thus the collars 30, 32 are free to rotate in said end walls 34, 35 as will be apparent. On the inner ends of all of the shafts 28, 31 and 33 are stop sleeves 36 to check outward or opening movement of the various wing sections.

In one directional rotation of the shafts 27, 28, 31 and 33, the sections will be moved inwardly and in the other directional rotation thereof, these sections will be moved outwardly. The latter movement is checked by the stops 36, whereas inward movement is checked by the walls 34, 35 etc., as will be apparent from a consideration of Fig. 3 of the drawings.

The aileron 19 is supported on a shaft 37, which is suitably supported in connection with the tube 26 of the outer section 18. On this shaft, within the section 18, is a sprocket or similar wheel 38 over which passes a chain 39, which in turn passes around a sprocket 40 of the shaft 41, the illustration in the drawing being diagrammatic. The shaft 41 is one of a plurality of telescoping shafts of square or other angular cross sectional form, or otherwise keyed together. The shaft 41 is arranged in the section 18, and telescopes within a shaft 42 in the section 17, the latter telescoping with a shaft 43 of the section 16 and finally with a shaft 44 in the housing 14. The shaft 44 of one wing structure is independent of the other, so as to provide independent control of the ailerons of each wing. Suitable controlling means is provided on the inner ends of the shafts 44, as indicated at 45, which are coupled with controls 46 in the pilot compartment of the airplane, which are diagrammatically illustrated.

The operating shafts 41—44 are thus keyed to each other and telescoped so as to maintain operation of the ailerons at all times and in the different positions of the wing sections.

Suitable controls 47 will be arranged in the control room for actuating forward and reverse clutch mechanisms 48 on the shafts 27 for rotating the various screw shafts in fully extending and in contracting the various wing sections.

It will be understood that the screw shafts will be operated from the motor shafts 49 through the clutches 48, particularly in the larger type of airplane construction. However, in smaller planes, the wing sections may be manually controlled and operated through suitable hand operated cranks and gearing employed.

Reference numeral 5 designates a circular opening extending through the tank for the purpose of permitting passage through the tank of the means (such as the shafts 27, 28, 31 or 33) for operating the wing sections. The wall 6 of the opening 5 is also made of the same material as the balance of the tank, and is accordion-pleated and reinforced in the same manner as the sides 3.

Reference numeral 7 designates a circular opening extending through the tank for the purpose of permitting passage through the tanks of the means (such as the shafts 44, 43, 42 or 41) compensating for the telescoped positions of the wing sections for actuating the ailerons in all positions of said wing sections. The wall 8 of the opening 7 is also made of the same material as the balance of the tank, and is accordion-pleated and reinforced in the same manner as the sides 3.

The cross-sectional contour of the tank is shown in Fig. 2, and corresponds generally to the cross-sectional contour of the inner wall surface of the wing section of the airplane. The length of the tank corresponds generally to the length of the wing section in which the tank is to be placed.

It will be readily understood that one tank, such as described, is placed in each wing section of an airplane of the character described, as well as in the fixed wing portion at the side of the fuselage, but is preferably omitted from the aileron, due to the relative thinness of the latter, which would render it uneconomical to attempt to place a fuel tank therein.

In Fig. 3 there is depicted a diagrammatic plan view of a part of the wing structure of an airplane of the type disclosed, showing the wing sections in an extended position with the fuel tanks of the type which I have described, positioned within such wing sections and in correspondingly extended position. The wing includes the fixed wing portion 14, and telescoping wing sections 16, 17 and 18. The fuel tanks are indicated by reference numerals 1, 2 and 3 and it will be apparent that upon retraction of each wing section, the fuel tank which is located in the preceding wing section is collapsed by the portion 23 of the wing section.

Figure 4:
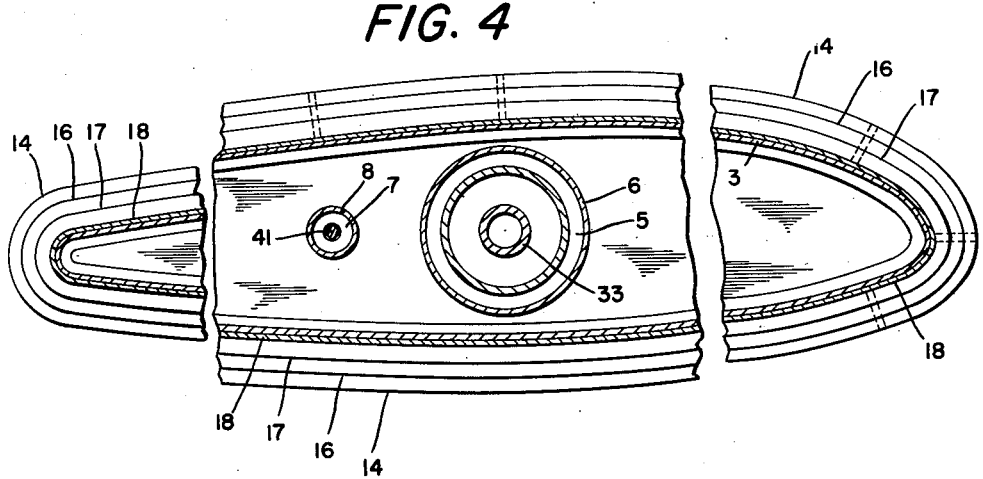
Fig. 4 is a fragmentary cross-sectional view, taken on the line 4—4 of Fig. 3.

The shafts 28, 31 and 33 are also shown in Figs. 3 and 4, as are the aileron actuating means 44, 43, 42 and 41.

Figure 5:
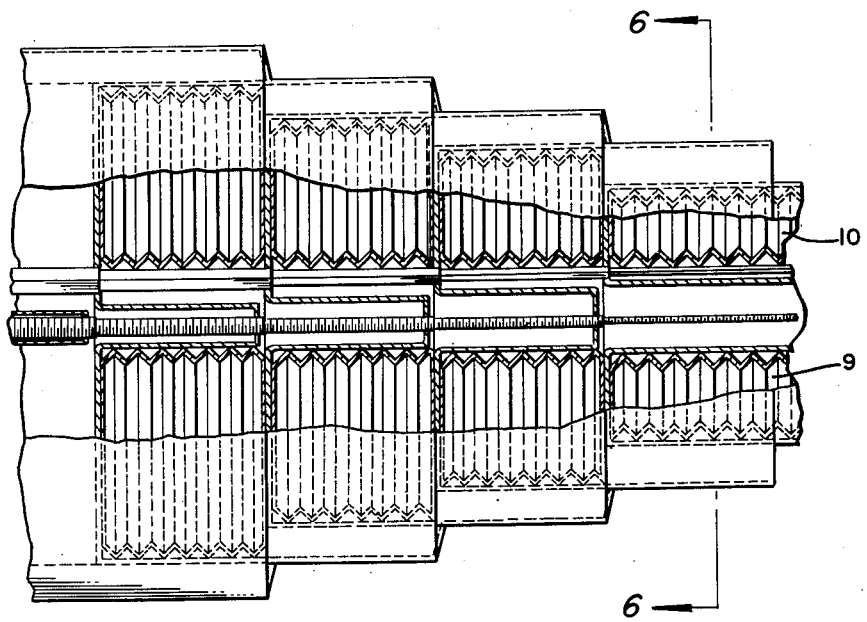
Fig. 5 is a view similar to Fig. 3, but showing a modification of the invention.
Figure 6:
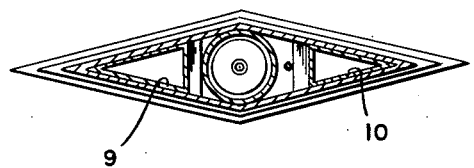
Fig. 6 is a fragmentary cross-sectional view, taken on the line 6—6 of Fig. 5.

In Figs. 5 and 6, there is illustrated a modification of the invention, in which, instead of using a single collapsible fuel tank in each wing section, two fuel tanks 9 and 10 are employed in each section which are preferably spaced apart as shown, in such a manner as to clear the aileron and wing section actuating means. Each of the tanks will therefore be of a construction similar to that of tanks 1, 2 and 3 but with the openings 5 and 7 omitted. The wing sections, in this case, are designed for supersonic flight.

The collapsing of the fuel tanks is thus effected automatically in response to the reduction of the wing span, and requires no attention on the part of the pilot or other member of the flight crew.

The collapsing of the fuel tanks can also be effected automatically by the fuel consumption and self-collapsing of each tank as the fuel therefrom is consumed or depleted. In this manner, certain of the fuel tanks may be used ahead of others, thereby collapsing the particular wing section or sections involved.

Moreover, the tanks may be quickly and easily installed in each wing section, as each wing section is installed, the construction of the wing sections and the manner of their assembly, as described in my aforesaid patent, greatly facilitating the installation of such tanks.

Although the details thereof form no part of the present invention, the filling and emptying of the tanks may be effected in various ways. For example, space may be provided between the leading and trailing edges of the wing sections and the fuel tanks, through which flexible tubing may be run to the various tanks. Another method involves running coil-like self-contracting tubes directly through the tanks, these tubes being provided with valve means for fueling or defueling through the tubes.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described my invention, I claim:

1. In combination with a fuselage having a fixed wing portion on each side thereof, a telescoping wing slidably mounted in each portion, each telescoping wing comprising relatively slidable sections, and collapsible fuel tanks disposed within said sections and portions, each tank having parts thereof within the path of travel of a telescoping section whereby said tanks are collapsed when the sections are telescoped.

2. The combination, as defined in claim 1, in which each fuel tank consists of substantially flat ends and accordion-pleated side walls.

3. The combination, as defined in claim 2, in which said fuel tanks are made of leakproof rubberized fabric.

References Cited in the file of this patent

UNITED STATES PATENTS

| | | |
|---|---|---|
| 1,533,312 | Fokker | Apr. 14, 1925 |
| 1,870,595 | Thaden | Aug. 9, 1932 |
| 2,207,713 | Bolster | July 16, 1940 |
| 2,415,584 | Fleiss | Feb. 11, 1947 |
| 2,423,095 | Gibson | July 1, 1947 |
| 2,432,025 | Lorenz | Dec. 2, 1947 |
| 2,550,278 | Makhonine | Apr. 24, 1951 |